May 4, 1965

C. A. RAMSEL ETAL 3,181,394

HYDRAULIC CONTROLS

Filed March 19, 1962

INVENTORS.
CHARLES A. RAMSEL
BY GERALD D. ROHWEDER
CLIFFORD L. SHOEMAKER

ATTORNEYS

INVENTORS.
CHARLES A. RAMSEL
BY GERALD D. ROHWEDER
CLIFFORD L. SHOEMAKER

Fryer and Zimwald
ATTORNEYS

May 4, 1965
C. A. RAMSEL ETAL
3,181,394
HYDRAULIC CONTROLS
Filed March 19, 1962
3 Sheets-Sheet 3
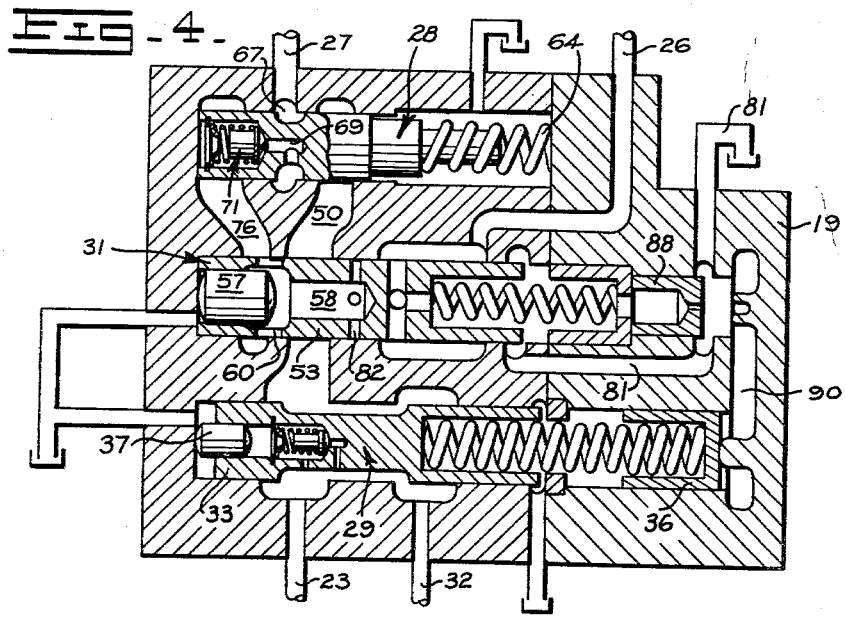
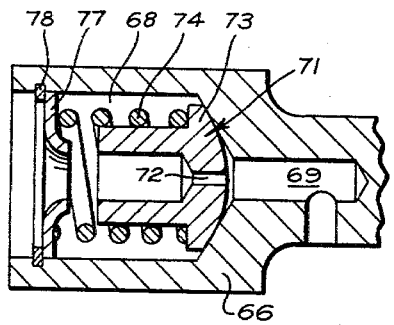
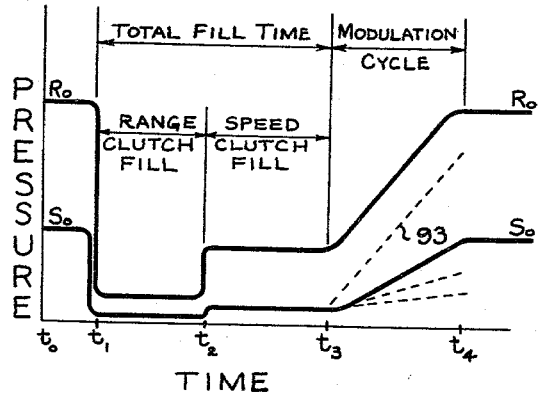
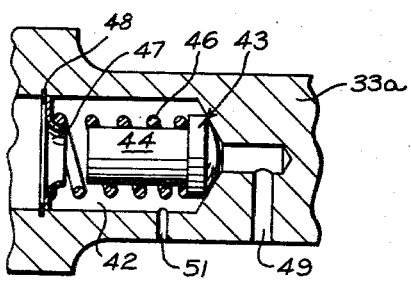
INVENTORS.
CHARLES A. RAMSEL
BY GERALD D. ROHWEDER
CLIFFORD L. SHOEMAKER
ATTORNEYS United States Patent Office 3,181,394
Patented May 4, 1965

3,181,394
HYDRAULIC CONTROLS
Charles A. Ramsel, Gerald D. Rohweder, and Clifford L. Shoemaker, Peoria, Ill., assignors to Caterpillar Tractor Co., Peoria, Ill., a corporation of California
Filed Mar. 19, 1962, Ser. No. 180,443
5 Claims. (Cl. 74—754)

This invention relates to hydraulic control means, and to hydraulic control means particularly adaptable for effecting shifting of a vehicle transmission of the type in which shifting is accomplished by hydraulic pressure applied in the transmission itself.

The invention is directed particularly to control means for a transmission of the type disclosed in the application for United States Letters Patent of Robert O. Chambers et al., for "Speed Change Transmission," Serial No. 143,-211, filed October 5, 1961, now Patent No. 3,115,789, issued December 31, 1963. The transmission therein disclosed comprises a forward section employing two brakes and a rotating clutch, for the selection of one of three possible conditions, and an output section employing three brakes for the selection of one of three possible conditions. By selectively activating a brake or clutch from the forward section, hereafter referred to as the speed brakes or clutch, and by engaging a brake from the rear section, hereafter referred to as the range brakes, six separate forward gears and one reverse gear may be obtained. Both the rotating clutch and the brakes of the transmission are of the disc type and are therefore capable of being engaged in varying degrees between complete disengagement and complete engagement thereby enabling smooth operation when activated by a modulated pressure source. The range gears in the output section of the transmission experience a much greater load than the speed gears of the forward section of the transmission and therefore require brake actuating pressure having different characteristics than that required for the speed brakes or clutch.

While the particular transmission to which reference has been made employs five ring gear brakes and a rotating clutch, the present invention is equally applicable to systems employing clutches exclusively, or brakes exclusively. Thus to simplify the description the invention shall be described as acting on clutches exclusively with the understanding that the invention is not limited thereto.

Accordingly, it is an object of the present invention to provide hydraulic control means for a power transmission having two sections requiring hydraulic pressures of different characteristics.

It is another object of the present invention to provide hydraulic controls for regulating the fluid pressure in two different sections of a transmission or the like so that there is a fixed relationship between the pressures at each mode of operation.

It is another object of the present invention to provide hydraulic control means which is supplied by a single source of hydraulic fluid and operates thereon to provide a pair of modulated pressure sources which are maintained at predetermined differences throughout their range of operation. The invention also provides means by which the difference between the modulated pressure sources can be varied in a relatively easy manner.

It is still a further object of the present invention to provide safety means which requires that the transmission be shifted to a neutral position after a pressure drop is experienced for more than a predetermined allowable time.

Still further objects and advantages of the invention and the manner in which it is carried into practice are made apparent in the following specification wherein the invention is described in detail by reference to the accompanying drawings.

In the drawings:

FIG. 4 is a view similar to FIG. 3 but with a resumption of pump flow and prior to resetting the safety valve;

FIG. 5 is an enlarged sectional view of a poppet valve which is part of the safety valve;

FIG. 6 is an enlarged sectional view of a poppet valve which is part of a modulating relief valve; and FIG. 7 is a pressure vs. time graph illustrating the pressure to the range clutches and to the speed clutches during various modes of operation.

Figure 1:
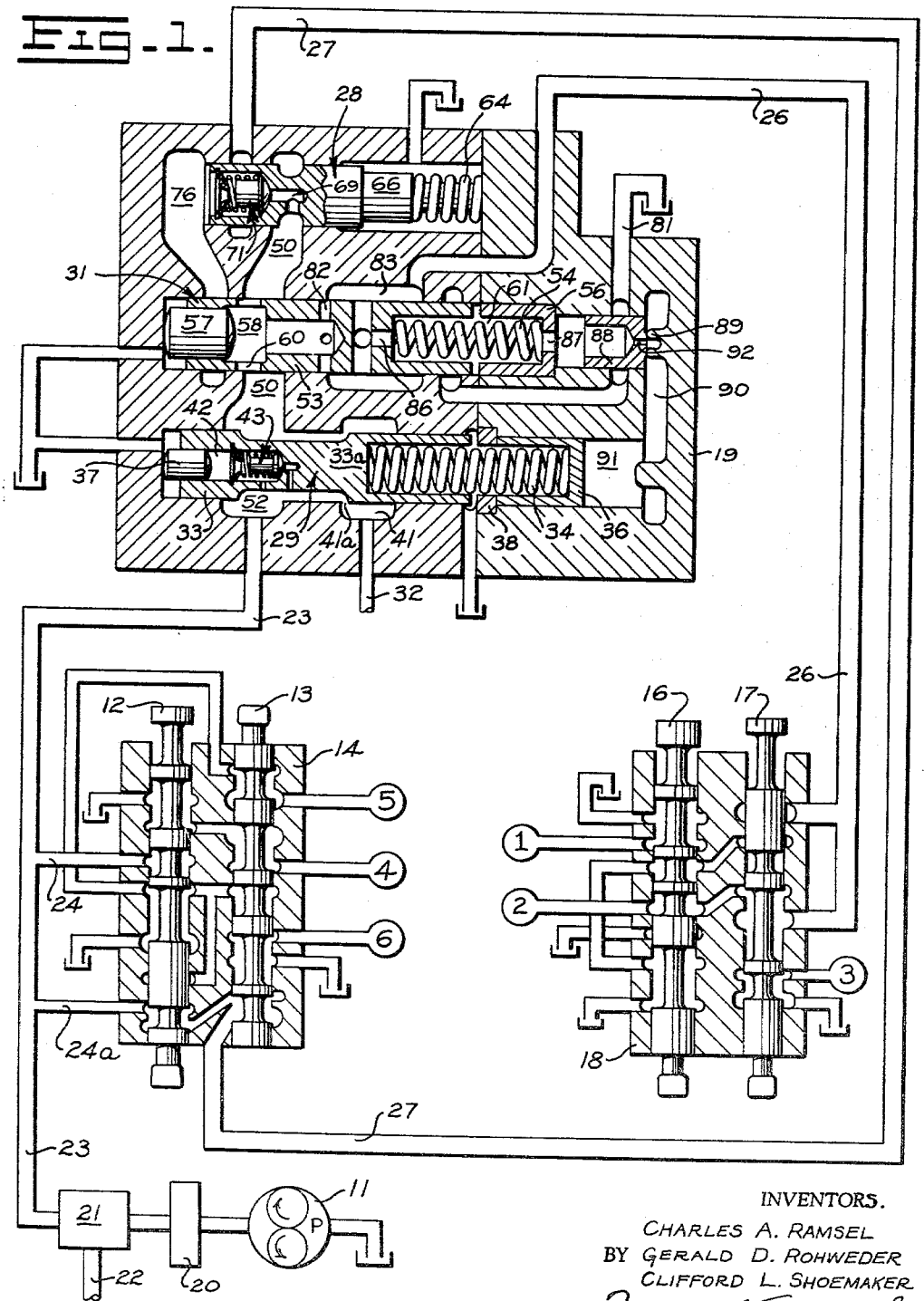
FIG. 1 is a schematic circuit diagram of hydraulic transmission controls embodying the present invention, and shown in a neutral condition.

Referring now to FIG. 1, a hydraulic pump 11 supplies fluid for actuating one of the clutches 4, 5 or 6—which could represent the three range clutches of the output section of the transmission referred to above—and one of clutches 1, 2 or 3—which could represent the three speed clutches of the forward section of the transmission. The particular range clutch which receives actuating fluid is determined by the positions of spools 12 and 13 of range selector valve 14, while the particular speed clutch which is activated depends upon the positions of spools 16 and 17 of speed selector valve 18. The sequence in which the range and speed clutches are activated and the modulation of the hydraulic pressure applied to the selected clutches is determined by the pressure control group 19.

Fluid from an engine driven pump 11 passes through a filter 20 into a flow control valve 21 where a predetermined amount of the fluid is diverted to a torque convertor through conduit 22 when a torque convertor is employed by the transmission, as is the case of the transmission referred to above. The undiverted fluid flows through conduit 23 to pressure control group 19, while branch lines 24 and 24a from conduit 23 direct fluid to range selector valve 14 where it is directed to one of clutches 4, 5 or 6. Hydraulic fluid emerges from pressure control group 19 through conduit 26 which leads to speed selector valve 18 and one of clutches 1, 2 or 3. A conduit 27 provides communication between range selector valve 14 and a safety valve group 28 of control group 19 for purposes to be described in detail below.

The pressure control group 19 comprises a modulating relief valve 29, a proportioning reducing valve 31, safety valve 28 and check valve 88. The modulating relief valve 29 regulates the pressure in conduit 23 and thus in the selected range clutch, by controlling the size of orifice 41a through which hydraulic fluid flows to a low pressure system, such as the transmission lubricating system or torque converter charging system, through conduit 32.

Modulating relief valve 29 comprises relief spool assembly 33, spring 34, load piston and spring retainer 36, and a slug 37. After clutch fill and during pressure modulation (FIG. 2) piston 36 is urged leftwardly until it contacts stop 38. The leftward movement of load piston 36 compresses spring 34 which responds by urging spool 33a leftward. As spool 33a moves to the left the size of annular orifice 41a between valve spool 33a and the edge of recess 41 decreases, increasing the restriction to flow and causing a rise in pressure in conduit 23 to steady state operating pressure (FIG. 1). During steady state conditions, fluid from conduit 23 enters a chamber 42 in valve spool 33a through a poppet valve 43 (FIGS. 1 and 6). The fluid in chamber 42 exerts a force against reaction slug 37 and the reaction force urges the spool to the right. Thus, when the force urging the spool to the right is equal to the force of spring 34 urging it to the left, the valve will be in equilibrium. In the event of a pressure drop in line 23 the spool moves leftward due to a corresponding drop of pressure in chamber 42, thereby causing a restriction of orifice 41a and a pressure rise in conduit 23. When the pressure rises above a predetermined level in conduit 23 spool 33 is urged to the right by the increased pressure in chamber 42, thereby increasing the opening of annulus 41a and decreasing the pressure in line 23 and the selected range clutch. In this manner the pressure of the fluid acting on the selected range clutch is maintained relatively constant.

Poppet valve 43 shown in greater detail in FIG. 6 consists of a poppet 44, poppet spring 46, spring retainer 47 and a block ring 48 for retainer 47. When the fluid pressure on the right side of poppet 44 is greater than the pressure of spring 46 and any fluid in chamber 42, the poppet will move to the left allowing fluid to enter chamber 42 through passage 49. Restrictive orifice 51, in spool 33a is another means for fluid to enter chamber 42 and provides the only means for fluid to exit therefrom, since a drop of pressure in line 23 below that in chamber 42 causes poppet 44 to close and prevent outward flow through passage 49. In this manner, poppet valve 43 serves to dampen movement of spool assembly 33 during sudden changes in line pressure.

A recess 52 around modulating relief valve 29, together with passage 50 provides a path for fluid from line 23 to pressure proportioning and reducing valve 31. Proportioning valve 31 comprises a spool 53, spring 54, fixed spring retainer 56 and a reaction slug 57 which is slidable with respect to spool 53. During steady state operation chamber 58 in valve spool 53 will contain fluid at the same pressure as that in conduit 23 by virtue of communicating passages 60 (FIG. 1). Thus the pressure in chamber 58 will be the same as that activating the selected range clutch. The pressure of the fluid in chamber 58 will exert a force against slug 57 and the reaction thereto will urge spool 53 to the right. During steady state operation there will also be fluid in spring chamber 61 at the pressure of the fluid in conduit 26 and therefore at the pressure of the fluid actuating the selected speed clutch. The pressure of the fluid in chamber 61 is exerted over the entire diametrical area of spool 53 while the fluid pressure in chamber 58 is exerted over the diametrical area of slug 57. Thus the force urging spool 53 to the right is equal to the pressure of the fluid in the selected range clutch times the area of slug 57. The force urging spool 53 to the left is equal to the pressure in the selected speed clutch times the area of the spool 53, plus the force of spring 54. Since these forces must be equal during steady state operation the following relationship exists:

$$\text{Range clutch pressure} = \frac{\text{area of spool}}{\text{area of slug}} \times \text{speed clutch pressure} + \frac{\text{spring force}}{\text{area of slug}}$$

Thus the range clutch pressure will always be equal to some factor, of one or more, times the speed clutch pressure plus a constant. By changing the diametrical dimension of slug 57 the relationship between range clutch pressure and speed clutch pressure can be easily varied to meet the requirements of a given system.

Figure 3:
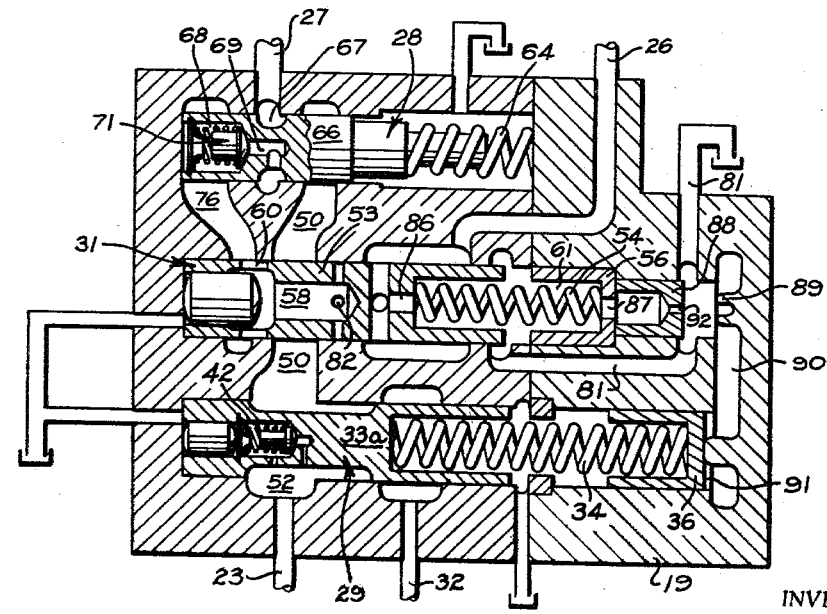
FIG. 3 is a view similar to FIG. 2 but showing the parts in positions assumed after a prolonged interruption of system pressure due to no pump flow.

Referring now to FIG. 3, the various parts of control group 19 are shown in the positions assumed when no hydraulic fluid flow is present, such as when the engine is shut off. Spring 34 of modulating relief valve 29, spring 54 of pressure proportioning and reducing valve 31 and spring 64 of safety valve 28 urge each of their associated spools to their extreme leftward position. As pump 11 (FIG. 1) begins to deliver fluid to conduit 23, recess 52, passage 50, and chamber 42 fill with fluid until sufficient pressure is built up in chamber 42 to counteract the force of spring 34 and position spool 33a to the right (FIG. 4). Until safety valve 28 is acted upon, spool 33a will be urged sufficiently to the right to enable all of the fluid flowing in line 23 to freely pass out of control group 19 through line 32.

Spool 66 of safety valve 28 will block communication of passage 50 with chamber 76 (FIG. 4) thereby preventing pressure in passage 50 from displacing proportioning valve spool 53 to the right to pressurize conduit 26.

Figure 2:
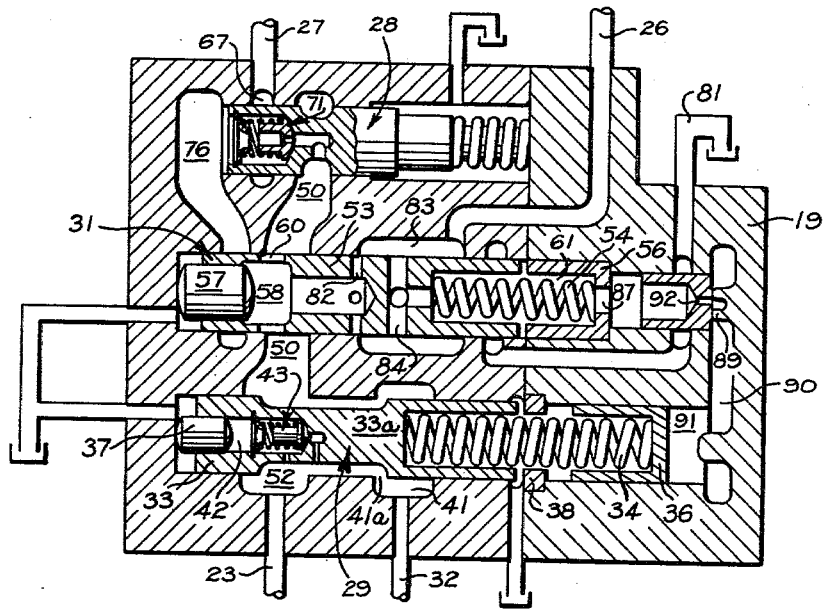
FIG. 2 is a schematic diagram of the control system of the invention separated from the hydraulic components of the transmission on which it acts and shown in a pressure modulating condition.

Thus, until the transmission is shifted to properly position spools 12 and 13 as shown in FIG. 1, safety valve 28 will remain in its "on" position as shown in FIG. 4 and thereby prevent fluid from entering a speed clutch. Once the control is shifted to position the spools as shown in FIG. 1 there exists communication between line 23 and line 27 via branch line 24a and spools 12 and 13 of valve 14 to provide fluid pressure to chamber 76 (FIG. 4) through recess 67, right angle passage 69, poppet valve 71, and chamber 68 of safety valve 28. The rise of pressure in chamber 76 will urge spool 66 to the right against spring 64 thereby providing communication between passage 50 and chamber 76 via recess 67, right angle passage 69, poppet 71 of safety valve 28 as shown in FIG. 2 to enable pressure in line 23 to enter chamber 76 and chamber 58 through passage 60 to urge proportioning valve 53 to the right.

Poppet valve 71 (FIG. 5) comprises poppet 73, spring 74, spring retainer 77 and snap ring 78 and functions in much the same manner as poppet valve 43 but differs in that a restrictive orifice 72 is in the poppet 73 rather than the spool. When the pressure of the fluid in right angle passage 69 is sufficient to overcome the force of poppet valve spring 74, fluid will freely enter chamber 68. When the pressure is greater in chamber 68 than passage 69, poppet 73 will close and require that the fluid flowing out of chamber 68 flow through restrictive orifice 72 and thereby restricts movement of safety valve 28 to the left during any sudden drop in line pressure.

Referring again to FIG. 4, as the pressure builds up in chamber 76 spool 66 of safety valve 28 is urged to the right and will be maintained in its "off" position without the aid of the hydraulic fluid supplied through line 27. Once this condition is satisfied, the transmission can be shifted out of neutral. At the same time, the pressure in chamber 58 of pressure proportioning and reducing valve 31 will urge spool 53 to the right (FIG. 2) since the only counteracting force is that of spring 54. With spool 53 in this position drain line 81 from spring chamber 61 is blocked and radial ports 82 from chamber 58 will communicate with recess 83 which surrounds spool 53. Recess 83 communicates with conduit 26 to the speed clutches through valve 18 (FIG. 1) and thus the fluid which flows from chamber 58 through ports 82 will fill the selected speed clutch. Radial ports 84 in spool 53 are in communication with recess 83, in all positions of the spool, and are also in communication with spring chamber 61 through port 86. Thus, as the selected speed clutch fills with the hydraulic fluid so does chamber 61. A central bore 87 in the end of spring seat 56 provides a path by which fluid in spring chamber 61 can pass to the interior of a floating check valve 88. As the fluid pressure builds up behind valve 88 it is urged rightwardly until it contacts stop 89. In this rightward position check valve 88 closes off communication between passage 90 leading to chamber 91, behind piston 36, and drain line 81. A restrictive orifice 92 in the end of valve 88 allows fluid to flow into chamber 91 and urges piston 36 to the left (FIG. 2). Under these conditions—the range valve selector in neutral position—the components of group 19 will be in steady state when the positions shown in FIG. 1 are reached.

Referring to FIG. 1, it is seen that conduit 27 has been blocked by the rightward movement of safety valve 28 and the fluid flowing in line 23 passes through annular orifice 41a to line 32. The force of the fluid in chamber 42 of modulating relief valve 29 is exactly counteracted by the force of compressed spring 34. It is to be noted that the area which the fluid pressure acts on to move the modulating valve spool to the right is the diametrical area of slug 37 while the area on which the fluid force acts to compress the spring and thereby urge the valve spool to the left is equal to the full diametrical area of load piston 36. Thus, the fact that the fluid pressure in chamber 91 is less than the pressure in chamber 42 (because of the proportioning reducing valve 31 and restrictive orifice 92) is compensated for. It is also to be noted that radial ports 82 which provide fluid to speed clutch supply conduit 26 have only the slightest communication with recess 83, since in the balanced or steady state condition it is only necessary to provide enough fluid to the speed clutch to replace the small amount which is lost through leakage or the like. Under these conditions the pressure in line 23 is at range clutch operating pressure (e.g. 415 p.s.i.) and the pressure in line 26 is at speed clutch operating pressure (e.g. 185 p.s.i.).

When spools 12 and/or 13 of range selector valve 14 (FIG. 1) are repositioned to enable one of the range clutches to fill with hydraulic fluid, the pressure in line 23 drops to clutch fill pressure. When the pressure in line 23 drops so does the pressure in passage 50, chamber 42 and chamber 58 which communicate therewith. As a consequence, both modulating valve spool 33a and proportioning valve spool 53 move to the left. As spool 53 of valve 31 moves to the left drain line 81 communicates with spring chamber 61 and passage 90 (since valve 88 also moves left) causing a drop of pressure in both areas. Because of the restrictive orifice in poppet valve 71 of the safety valve out of which fluid is required to flow, the flow of fluid out of chamber 68 due to the pressure drop in passage 69 is not rapid enough to give rise to sufficient leftward movement of the safety valve to place it in the safety "on" position. It is only when a pressure drop is experienced for a time greater than that which occurs during a normal gear shift that safety valve 28 moves to the left (safety "on" position) and requires a shift to the neutral position before the transmission can be engaged into one of the moving gears. The time necessary to set the safety valve "on" can be changed by altering the size of restrictive orifice 72.

As the range clutch fills, sufficient pressure is built up in chamber 58 to move spool 53 rightwardly and allow the selected speed clutch to fill. When the speed clutch has filled pressure builds up in chamber 61 urging valve 88 to the right, giving rise to a build up of pressure behind piston 36 as described above. As the pressure builds up behind piston 36 it is urged to the left in a continuous manner until it reaches the position shown in FIG. 1. As the piston moves to the left spring 34 is compressed causing leftward movement of valve spool 33a with an accompanying pressure rise in the selected range clutch due to the closing of annular orifice 41a. As the range clutch pressure rises so does the speed clutch pressure (in accordance with the relationship between the two pressures set out above) until the previous steady state operating condition is again achieved.

The pressure vs. time graph of FIG. 7 illustrates the sequence at which the various pressures which the system experiences take place after a shift from one gear to another. Assuming that at some time $t_0$ the range clutch and speed clutch are operating at steady state pressures $R_0$ and $S_0$, respectively, the effect of a shift of gears at time time $t_1$ will be a sudden drop of pressure in the range clutch to range clutch fill pressure. At time $t_2$ the range clutch is filled and the speed clutch begins to fill through radial ports 82 which, because of being slightly restrictive and because of the pressure needed to shift spool 53 to the right, fills at a reduced flow rate and at a lower pressure than the range clutch. After both clutches have filled, the pressure behind piston 36 increases causing an increase in range clutch pressure with a corresponding increase in speed clutch pressure as illustrated between times $t_3$ and $t_4$. Thus, between times $t_3$ and $t_4$ pressure is provided to each clutch at the particular increasing rate necessary for it to give smooth load pick-up. At the end of the modulation time, $t_4$, the pressure of the range clutch is back to $R_0$ and the pressure of the speed clutch is back to $S_0$. A number of dotted lines between time $t_3$ and time $t_4$ illustrate the effect of changing the size of slug 57. As the diameter of the slug is increased toward the diameter of the spool the rate at which the speed clutch pressure increases during the modulation cycle approaches that of the range clutch pressure, as illustrated by dotted line 93. Even when there is a unity relationship between the diametrical area of slug 57 and spool 53 the operating pressure of the selected range clutch and the selected speed clutch will differ by the spring force factor in the relating formula.

When there is a drop in flow from pump 11 for a time greater than experienced during a normal shift, enough fluid will flow out of orifice 72 in poppet 73 (FIG. 5) to allow sufficient leftward movement of spool 66 (FIG. 3) to block communication between passage 50 and passage 69. This places the safety valve in the "on" position which requires a shift to neutral before the vehicle can be operated. This feature of the control group 19 requires that the vehicle be started in neutral and thus insures against inadvertent vehicle movement when it is being started.

Whereas the pressure control group 19 of the present invention has been described with reference to its operation in connection with a hydraulically operated transmission, it will be understood by those in the art, that the invention has utility in connection with any system requiring a pair of modulated pressure sources which are functionally related.

What is claimed is:

1. In a pressure control group for a hydraulic system the combination comprising:

a modulating relief valve receiving incoming fluid from a source and diverting a portion thereof out of the control group through a variable flow, low pressure passage;

means responsive to pressure of the incoming fluid above an equilibrium pressure to increase flow through the passage and responsive to pressure of the incoming fluid below the equilibrium pressure to restrict the flow;

a proportioning reducing valve in communication with said modulating valve and having an orifice through which undiverted fluid from said modulating valve flows to an output passage, said proportioning reducing valve being operative to maintain the pressure of the fluid in the output passage at a level which is functionally related to the pressure of the undiverted fluid, wherein the functional relationship is expressed by a factor proportional to the pressure of the undiverted fluid plus a constant, and wherein the pressure in the output passage is always less than the pressure of the undiverted fluid;

means responsive to a predetermined fluid pressure in the output passage to severely restrict the communication of the orifice with the output passage; and means for increasing the equilibrium pressure of said modulating valve up to a pre-set operating pressure.

2. The control group of claim 1 wherein said proportioning reducing valve comprises;

a valve spool slidably disposed in a valve bore and having a first pressure chamber in one end and a second pressure chamber in the other end;

a slug slidable with respect to said spool, and disposed in the first chamber end of said spool such that fluid pressure in the first chamber exerts a force against said slug and the reaction thereto urges said spool toward the other end;

a valve spring in the second chamber urging said spool toward said slug;

the first chamber in communication with, and receiving fluid from, the modulating valve, the second chamber in communication with the output passage such that a portion of the fluid flowing through the orifice to the output passage enters the second chamber and combines with said spring to urge said spool toward said slug;

the area of said slug on which fluid pressure in the first chamber acts being no greater than the area of said spool on which fluid pressure in the second chamber acts so that the following relationship exists:

$$\text{Pressure of fluid to said proportioning and reducing valve} = \frac{\text{area of spool}}{\text{area of slug}} \times \text{pressure of fluid in output passage} + \frac{\text{spring force}}{\text{area of slug}}$$

3. The control group of claim 1 wherein said last mentioned means comprises;
   a valve spring secured at one end to said modulating valve and at the other end to a piston slidable within a piston bore; and
   a valve having a restrictive orifice therein and in communication with a source of fluid at the pressure of the fluid in said output passage, the restrictive orifice communicating with the piston bore such that the pressure of the fluid which passes through the restricted orifice urges said piston to compress said spring which in turn urges said modulating valve to restrict flow to the low pressure passage.

4. In a hydraulic control system for modulating and regulating the pressure of fluid to gear selecting mechanism of a transmission having two sections each of which requires fluid operating pressures of different characteristics the combination comprising;
   an engine driven fluid pump supplying working fluid to a conduit;
   first gear selecting mechanism communicating with said conduit;
   a modulating valve communicating with said conduit and diverting a portion of the fluid therefrom through a variable flow passage;
   a proportioning reducing valve in communication with said modulating valve and receiving undiverted fluid therefrom which is delivered at a lower pressure, which is a function of the undiverted fluid pressure, to an output passage which communicates with said proportioning reducing valve;
   second gear selecting mechanism communicating with the output passage;
   said modulating valve responsive to conduit pressure above an equilibrium pressure to increase flow through the variable flow passage and responsive to conduit pressure below the equilibrium pressure to restrict flow through the variable flow passage; and
   means active after the two selecting mechanisms have filled with fluid to increase the equilibrium pressure of said modulating valve up to a pre-set steady state pressure.

5. In a pressure control group for a hydraulic system the combination comprising:
   a modulating relief valve receiving fluid from a source and diverting a portion thereof out of the group; and
   proportioning reducing valve means disposed to receive the undiverted flow from said modulating relief valve and operative to provide to an output conduit fluid that is at a pressure which is at all times less than the pressure of the fluid delivered to said proportioning reducing valve means from said modulating relief valve and is functionally related thereto, wherein the functional relationship is expressed by a factor proportional to the pressure of the fluid received by said proportional reducing valve plus a constant.

References Cited by the Examiner
UNITED STATES PATENTS
3,085,449  4/63  De Corte et al.

DON A. WAITE, *Primary Examiner.*